United States Patent [19]

Pannell

[11] 4,371,305

[45] Feb. 1, 1983

[54] MATERIAL HANDLING APPARATUS

[76] Inventor: Robert T. Pannell, Crest Line Rd., Kennett Square, Pa. 19348

[21] Appl. No.: 879,903

[22] Filed: Feb. 21, 1978

[51] Int. Cl.³ .......................... A01G 1/04; B65G 3/20; B65G 15/28

[52] U.S. Cl. ........................................ 414/300; 47/1.1; 198/750; 222/200; 222/226; 414/272

[58] Field of Search ............... 214/16 R, 16.4 R, 17 C, 214/17 D; 47/1.1; 141/9; 222/226, 244, 252, 200; 198/533, 616, 620, 750; 414/269, 300, 293; 100/68

[56] References Cited

U.S. PATENT DOCUMENTS

| | | | |
|---|---|---|---|
| 968,364 | 8/1910 | Keran | 222/200 |
| 1,533,847 | 4/1925 | Freedenburg | 214/18.22 |
| 2,301,088 | 11/1942 | Stahl | 198/620 |
| 2,649,978 | 8/1953 | Smith | 214/26 |
| 2,746,621 | 5/1956 | McIntyre | 214/17 C |
| 3,399,466 | 9/1968 | Hartley | 198/616 X |
| 3,767,089 | 10/1973 | McKee et al. | 222/226 |
| 3,881,409 | 5/1975 | Frigieri | 100/68 |
| 4,119,193 | 10/1978 | Sancken | 214/16 R X |
| 4,170,432 | 10/1979 | Pia | 414/269 |

Primary Examiner—Robert G. Sheridan
Attorney, Agent, or Firm—Connolly and Hutz

[57] ABSTRACT

Apparatus is provided for depositing material, such as mushroom casing, on a horizontally moving belt from which the material is discharged to a surface beneath said belt. The material may be deposited first in a conveyor box which contains an element capable of moving the material in the box from one end of it to its other end, the said conveyor box having an outlet through which the material is passed to a distributing container. If preferred, the material may be deposited directly in the distributing box. This container also has in it means for moving the material from one of its ends to the other, as desired, in order to achieve a substantially uniform distribution in it of the material. The container has in it an outlet which comprises a slot of uniform gap. This gap is located in a position to be in delivery relationship with said moving belt. The gap is formed through the use of a cut-off plate that may be constructed of adjustable sections. The container also is equipped with a means to discharge the material through said gap onto said belt to form a layer thereon that is substantially uniform in its width and thickness. The discharging means used in getting a uniform layer comprises, in the main, the moving belt but the means for moving the material in the distributing box participate in the effective discharge. One end of the belt is fixed to a roller on which most of the belt is wound. The other end is fixed to a platform near and underneath the distributing box. As the belt moves forward horizontally, it is in effect unwinding, and the material on it falls off at the reversal point of the belt onto a surface, usually a prepared bed of compost.

19 Claims, 11 Drawing Figures

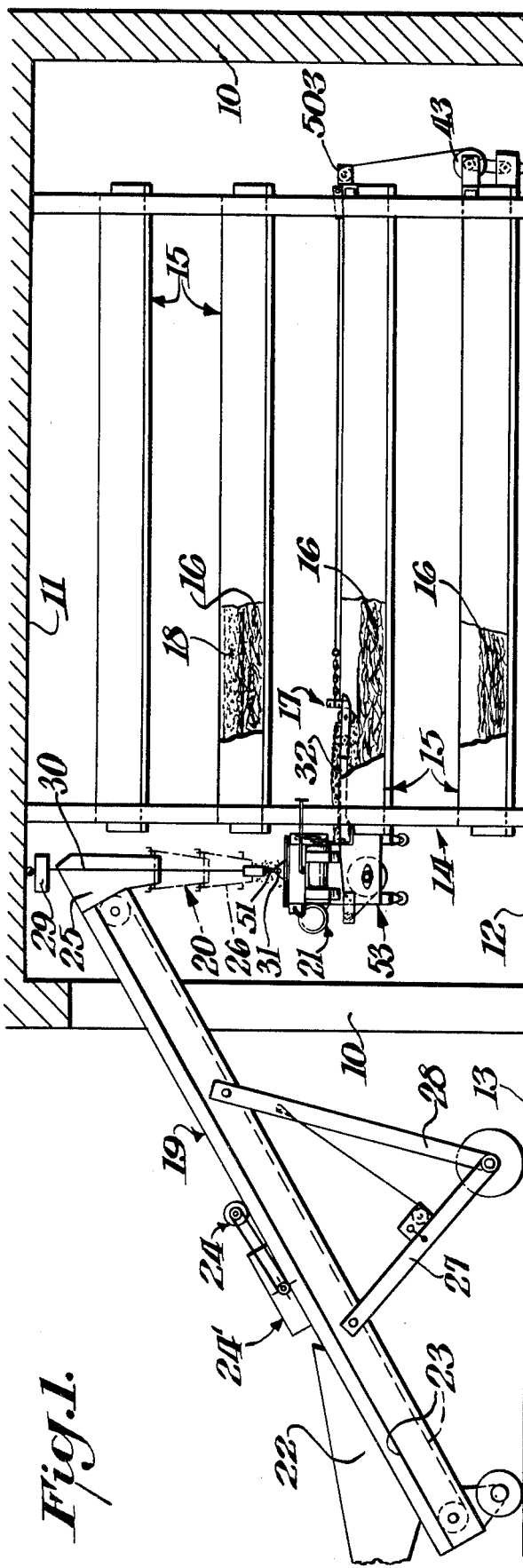
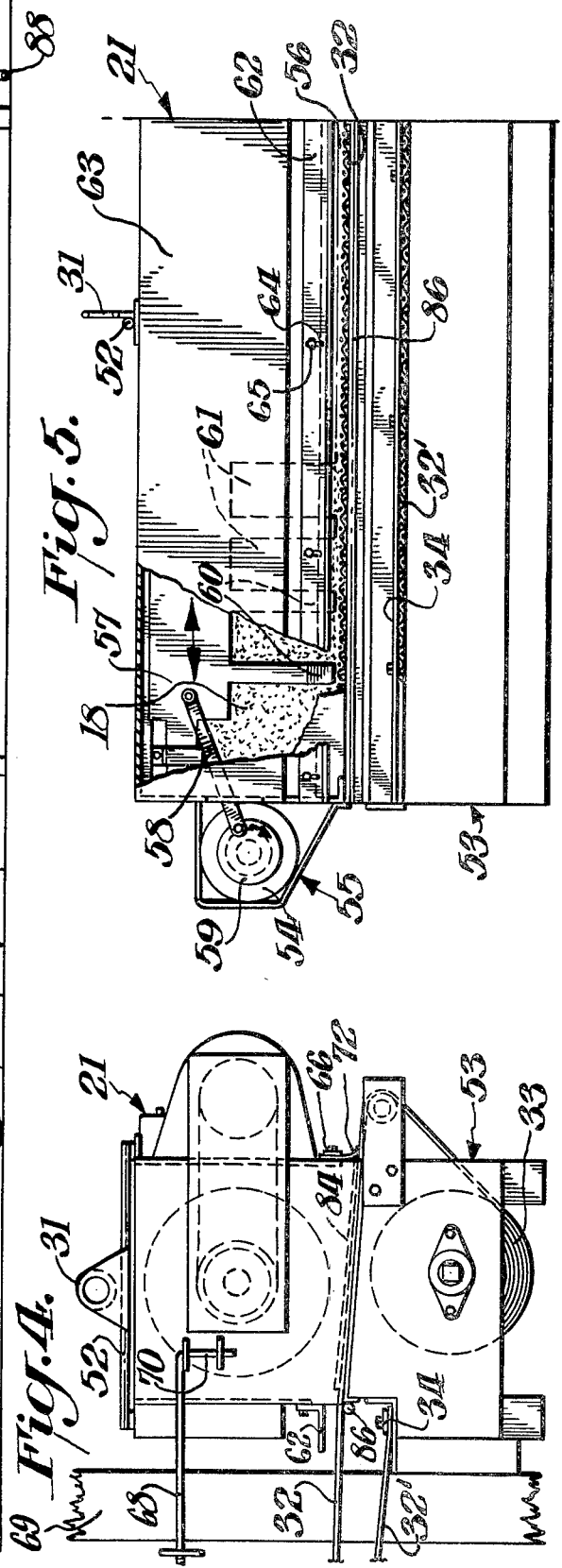

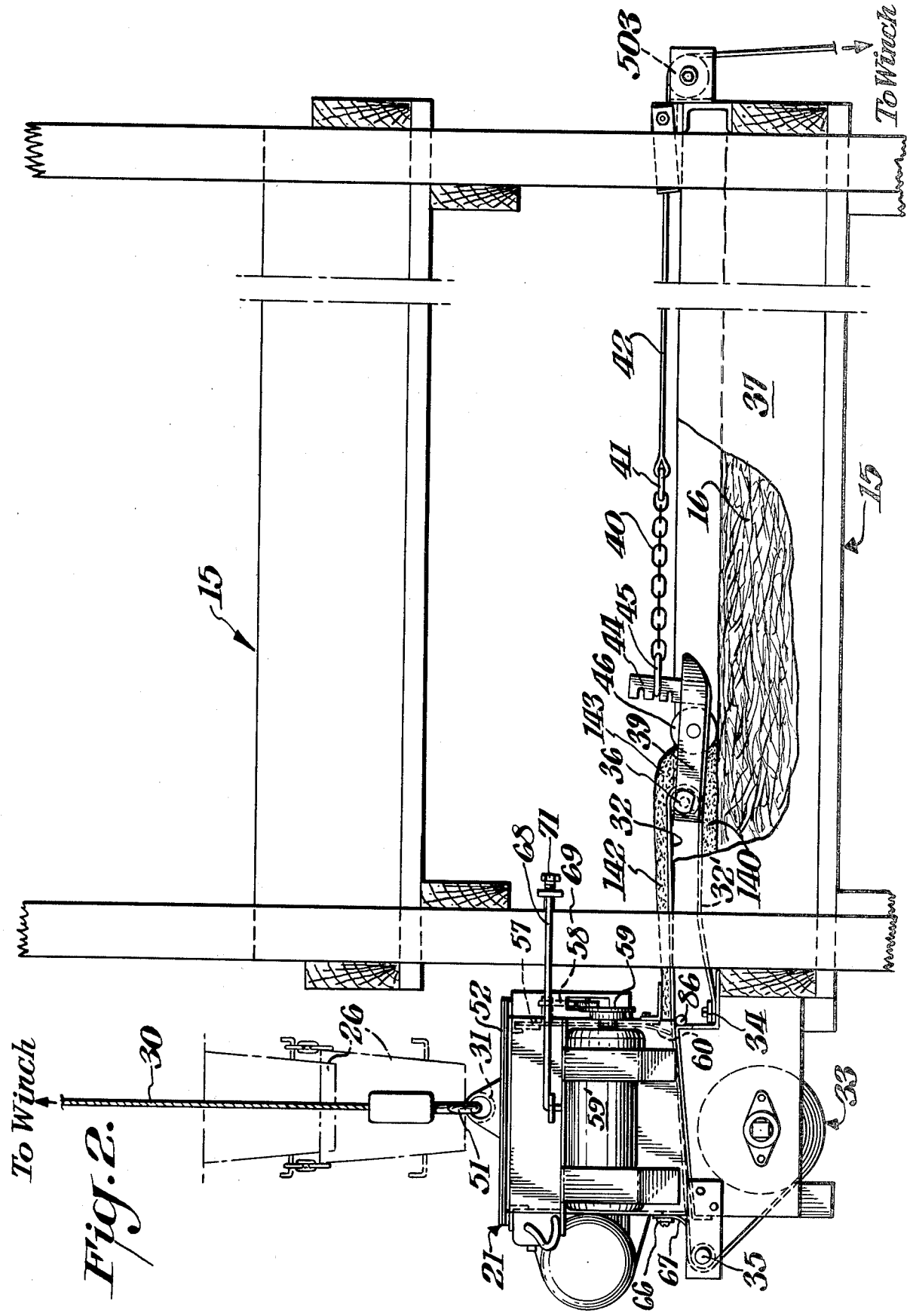

MATERIAL HANDLING APPARATUS

BACKGROUND OF THE INVENTION

Basically, there are two methods of growing mushrooms commercially: the bed and the tray methods. While the apparatus of this invention may be employed in the latter procedure, this invention will be described with particular reference to its application in the shelf (bed) system method.

In the tray system mushrooms are grown in wooden trays which range in size from 4 ft.×4 ft. to 4 ft.×8 ft. and so on. The major advantage of the tray system over the shelf system has been the ability to mechanize all of the mushroom growing operations. This lowers the use of manual labor in moving material. Some of the main drawbacks with tray systems are damage to the trays and costs. In moving the heavy trays from one machine to the next and from room to room quite a bit of wear and tear on the trays is experienced due to the weight of the compost in the tray. Another disadvantage has been the high cost of the tray handling machinery and the need for qualified electricians and fitters to maintain the machinery. Damages to wooden trays, the need for high cost machinery, and the need for full-time electricians and fitters all add up to high operation costs in the tray system.

Until recently, in the shelf system, all of the operations (filling, spawning, casing, picking, emptying of the shelves) were done by hand. The reason for this has mainly been due to the size and shape of the building and its necessary contents. In a growing operation utilizing the shelf system mushrooms are grown in shelves which are about 65" wide and about 60 ft. long. These are usually stacked in a superimposed position, six or so in a tier, in adjacent tiers that are about 12 ft. high. The vertical distance between these superimposed shelves is about 24". The dimensions of mushroom buildings, however, often varies from plant to plant. Two or four of the above mentioned tiers are usually placed in a growing room. The aisles between adjacent tiers are generally no more than 32" wide. The head room from the top of the top shelf to the ceiling is also usually limited to about 3 feet. At the front and rear of each tier only about 3 ft. of space is left between the shelf and the respective wall of the building. To further complicate the problems from a material handling standpoint, the only access into these growing rooms usually is a door which is about 32" wide and only 6 ft. high. The above description will make it obvious that room for machinery and attendant personnel is very limited and that all the mushroom growing operations have previously been limited to time consuming, arduous manual labor. Further, the compact arrangements just described are quite typical, since much of the success of a commercial operation depends upon proper use of heat, air and other environmental factors. Since there are a large number of commercial shelf systems in use, the need for mechanization has been and is great.

In the cultivation of mushrooms a growing medium is placed in the above mentioned shelves to a depth of about 12". After all of the shelves in a growing room are filled with the medium (compost), the entire room is sealed off, and the compost is allowed to heat up thereby completing pasteurization. After pasteurization the compost is spawned (planted with the seed). Approximately 14 days after spawning, the compost is covered with a layer of soil (casing) to induce fruiting of the mushroom. In the past this soil was carried in buckets and dumped on the bed manually. After the buckets were dumped on the compost, it was necessary to level the layer of soil to form an even layer. Not only is this work difficult, but it is hardly possible to apply a uniform layer, a most important factor in the production of mushrooms. The application of this layer of soil triggers a micro-biological activity between the medium (compost) and the casing without which few, or no mushrooms at all, are produced.

Accordingly, a purpose of this invention is the provision of apparatus for effecting the casing operation efficiently with a minimum of personnel. Another aim is providing apparatus which can be easily installed and moved around in the confined spaces of the quarters normally found in the industry using the shelf system. A still further goal is assuring the production of a uniform layer of casing. Another purpose is to eliminate or minimize contamination by providing for automatic movement of materials by machinery with but little or a minor amount of direct contact of material by workers. These and further objectives will appear hereinafter.

BRIEF DESCRIPTION OF THE INVENTION

A feed elevator is positioned outside the building and is adapted to carry soil from a storage bin upwardly into the building to a height above the topmost shelf. It delivers soil to a cross-conveyor. The elevator, of course, is so constructed so that it fits into the close quarters normally encountered. Its height is adjustable and it is equipped with a lump shredder. The compact cross-conveyor is reversible so that it can feed soil to the right or to the left of the elevator. This makes it possible to feed soil first to one tier and then to its adjacent tier, if desired. The soil is fed from the cross-conveyor to a soil distributing box, or directly to said box if the cross-conveyor is not used. Within the box is a means, such as an auger, for moving soil to the right or left. The distributor is mounted on the end of the shelf. It contains a gap through which the soil is forced. An oscillator is associated with the gap; this assists in getting an even distribution of soil onto the net that is immediately below the box or is acting as a moving bottom in the box. The oscillator also breaks up soil and prevents clogging or the formation of empty spaces in which no casing is moving. If the auger produces a compacted mass within the distributing box, the oscillator breaks up that mass. The oscillator also dislodges any stone or the like that gets lodged or stuck between the cut-off plate and the bottom of the distributing box. Instead of the auger one may use chute 20, or its like, in an oscillating manner to keep the distributing box full of material from one end to its other, or this may be done by hand. The auger is preferred.

The net is contained on a roller in such fashion that one end is fixed to said roller and the other end is fixed, for example, to a platform or plank just beyond the end of the shelf, said platform generally being unitary with the housing or support for the roller. The roller on which the net is partially wound does not move horizontally but only rotates. The net unit is generally contained in supporting apparatus that is movable simultaneously with the distributing box. The distributing box and the net container are separable to ease handling, for example, in the washing of the net as needed. A net pulley roller is provided that is pulled by a winch located at the far end of the tray. As the pulley roller is pulled the length of the shelf, it not only causes the net to unroll from the roller, but it dumps the casing onto the compost that has been previously prepared on the shelf. Located ahead of the net pulley roller may be a heavier, idle roller which acts to compact and level the compost before it receives the casing. The net may constitute a horizontally moving bottom for the distributing box, or the box may have a permanent, fixed bottom. In the preferred embodiment, the distributing box has a plate in its bottom that extends from the back wall where the net enters the box almost to the front wall where the net leaves the box. In other words, the net rides over this plate as it goes through the box except for the last few inches or so below the cut-off plate in which area the net acts solely as the bottom of the box. This arrangement allows for the discharge of any stone of similar article without damage to the net and without disrupting the uniformity of the layer. The stone forces the net downwardly in the unsupported area which is just at or near the cut-off plate, so that the stone moves downwardly and out of the box as the net does the same.

All of the activity is synchronized by appropriate electrical starting and stopping switches. Thus, as the belt starts to move horizontally, the distributing box is activated to eject from the outlet soil in such a manner that it is uniformly laid down on the net. Since the net is uniformly or steadily correlated in its width to the width of the shelf and the soil on the net is uniform in its height, a layer that is uniform in width and thickness is formed on the compost.

The invention will be further described with reference to the description and drawings below all of which is given for illustrative purposes only and is not limitative, the drawings being as follows:

FIG. 1 is a side elevation, partially broken away, depicting one embodiment of this invention in which said cross-conveyor is replaced by a chute conveyor, and the casing is deposited directly in the distributing box;

FIG. 2 is a right end elevation, partially broken away, of the apparatus of FIG. 1;

FIG. 4 is a left end elevation of the apparatus of FIGS. 1-3;

FIG. 5 is a side elevation of the fragmental portion of one form of a distributing box;

Figure 7:
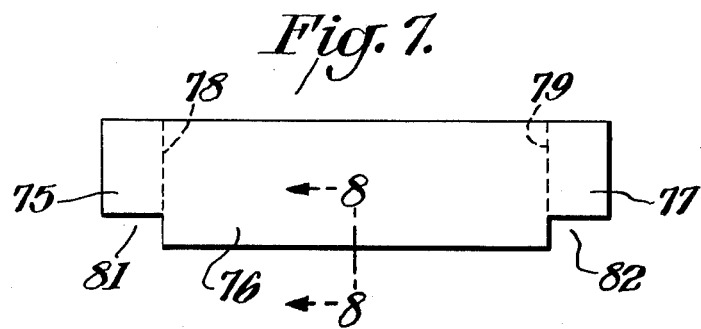
FIG. 7 is a plan view of a preferred cut-off plate.
Figure 8:
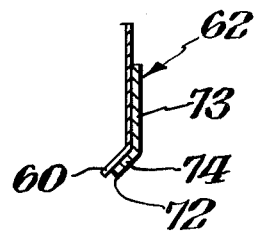
Figure 9:
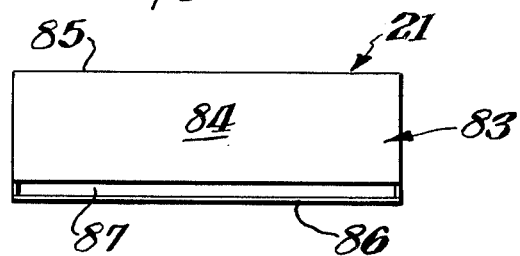

FIG. 8, taken on line 8—8 of FIG. 7 shows the knife-blade configuration of the plate and has added to it the configuration of the oscillator teeth that ride on or in close sliding relationship with the back wall of the cut-off plate;

FIG. 9 is a plan view of a preferred bottom for the distributing box; and

Figure 10:
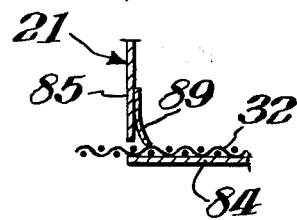

FIG. 10 is a detail showing the relationship of the skirt or apron on the distributor that holds the moving belt in close contact with the bottom of the distributor.

DETAILED DESCRIPTION OF THE INVENTION

Referring to FIG. 1, it can be seen that walls 10, ceiling 11 and floor 12 are parts of the mushroom building or the growing room in which the equipment of this invention is to be used. The floor 12 at this end of the building is normally level with the ground 13 outside. Generally, the tier 14 extends downwardly below ground level 13 but only the shelves 15 that are above ground 13 are shown for convenience. With tiers below ground level 13 which is at the front of the building, the bottommost tier is generally at ground level at the rear of the building which building is usually built on a hill.

At 16 in FIG. 1, in the lowest cutaway view, is shown compost laid on a shelf 15. In the cutaway view immediately above, there is shown the advancing belt 17 device used in this invention in its initial or early position ready to move further along the shelf 15 from the left to the right. In the topmost exposed view of FIG. 1 can be seen the layer 18 of casing that has been laid down on compost layer 16 in an earlier use of the equipment of this invention.

The apparatus of FIG. 1 comprises the elevator 19, the hopper or chute element 20, and the distributing box 21 as well as the horizontally moving net apparatus 17. Casing 18 is fed into hopper 22 from a storage source and onto endless belt 23 which is activated by a motor not shown for convenience. Motor 24 drives shredder 24' that contains rotating teeth or oscillating teeth like those (60) in FIG. 5. Such shredding devices break up clumps of material coming from hopper 22 so that distributing box 21 receives casing relatively free of clumps and is, thus, quite powdery and flowable. This shredding materially aids in obtaining a uniform layer of casing.

The casing is carried upwardly on belt 23 and dumped into chute 20. While this can comprise a cylindrical or conical element 25, the provision of a plurality of such elements of successively smaller size affording telescoping of these units 26 (shown in phantom) can be used. Frequently, six shelves 15 are present in tier 14. Through the use of the telescoping chute 20 elevator 19 need not be raised or lowered though it may be through pivotable supports 27 and 28. The raising and lowering of distributor box 21 from shelf to shelf is done through support 29 anchored, for example, in ceiling 11. Support 29 comprises a winch, usually motor driven, to afford the winding and unwinding of cable or rope 30 thereby affording the raising and lowering of box 21 from shelf to shelf. It will be noted, in FIG. 6 for example, that cable 30 is attached or attachable at its lower end to bracket 31 fixed to box 21. The box 21 is during its operation well secured, as described below, to the shelf 15 that is to be prepared.

Figure 6:
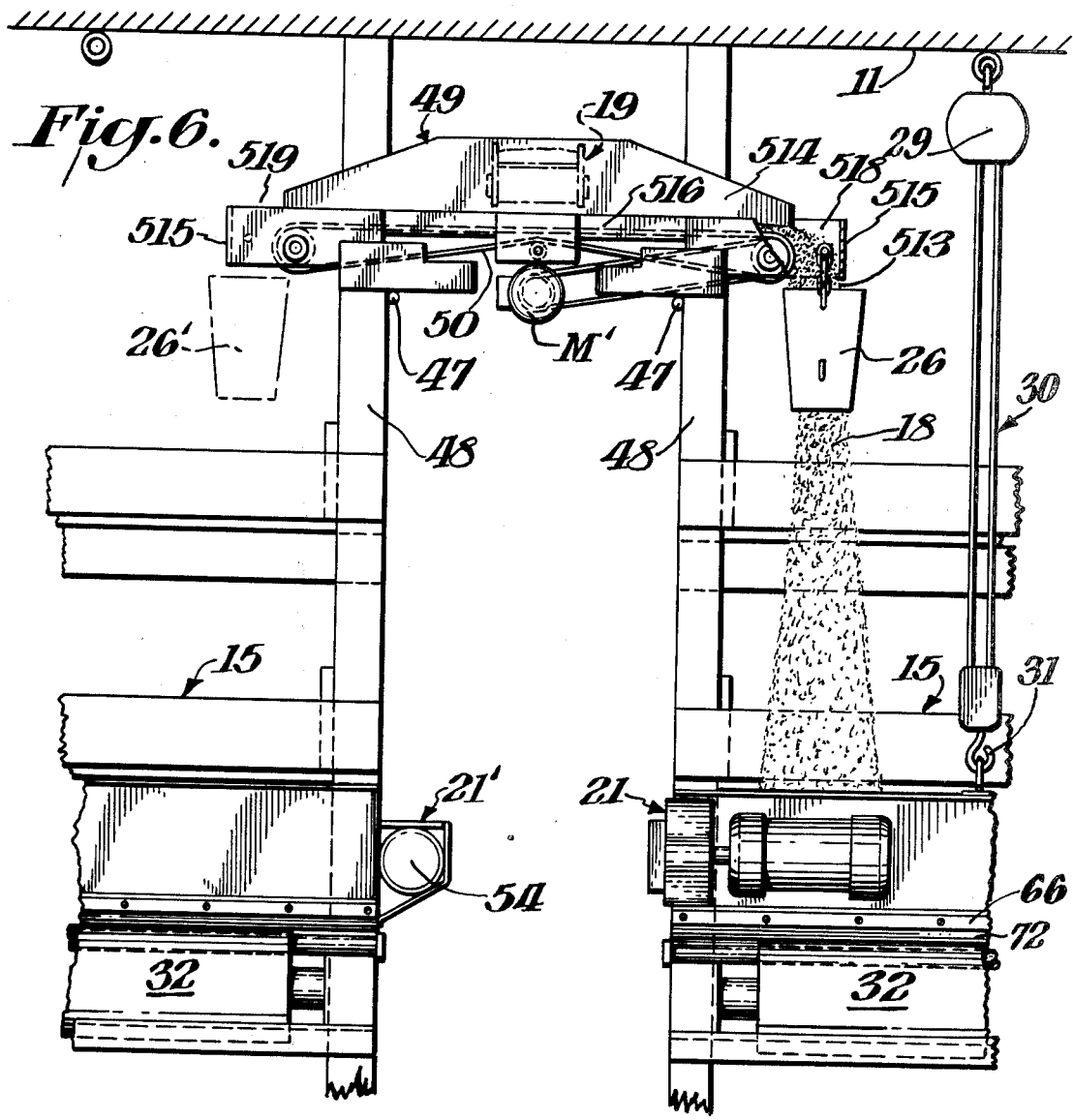
FIG. 6 is a front elevation view, partially broken away, of the cross-conveyor of this invention.

FIG. 6 also shows the fall of material 18 downwardly past several tiers and into distributing box 21. In actual practice virtually all of the material 18 falls into box 21 so that a plurality of chutes 26 is not needed. The amount of material being carried by elevator 19 is correlated with the amount going through chute 26 and into box 21 through the use of electric motors all activated or stopped by a single operator who sees the falling material 18 and the load in box 21. Allowing the free fall of material 18 over distances of 12 ft. or so is a distinct advantage since equipment is eliminated making for lower construction costs and for greater ease in moving the apparatus.

Figure 3:
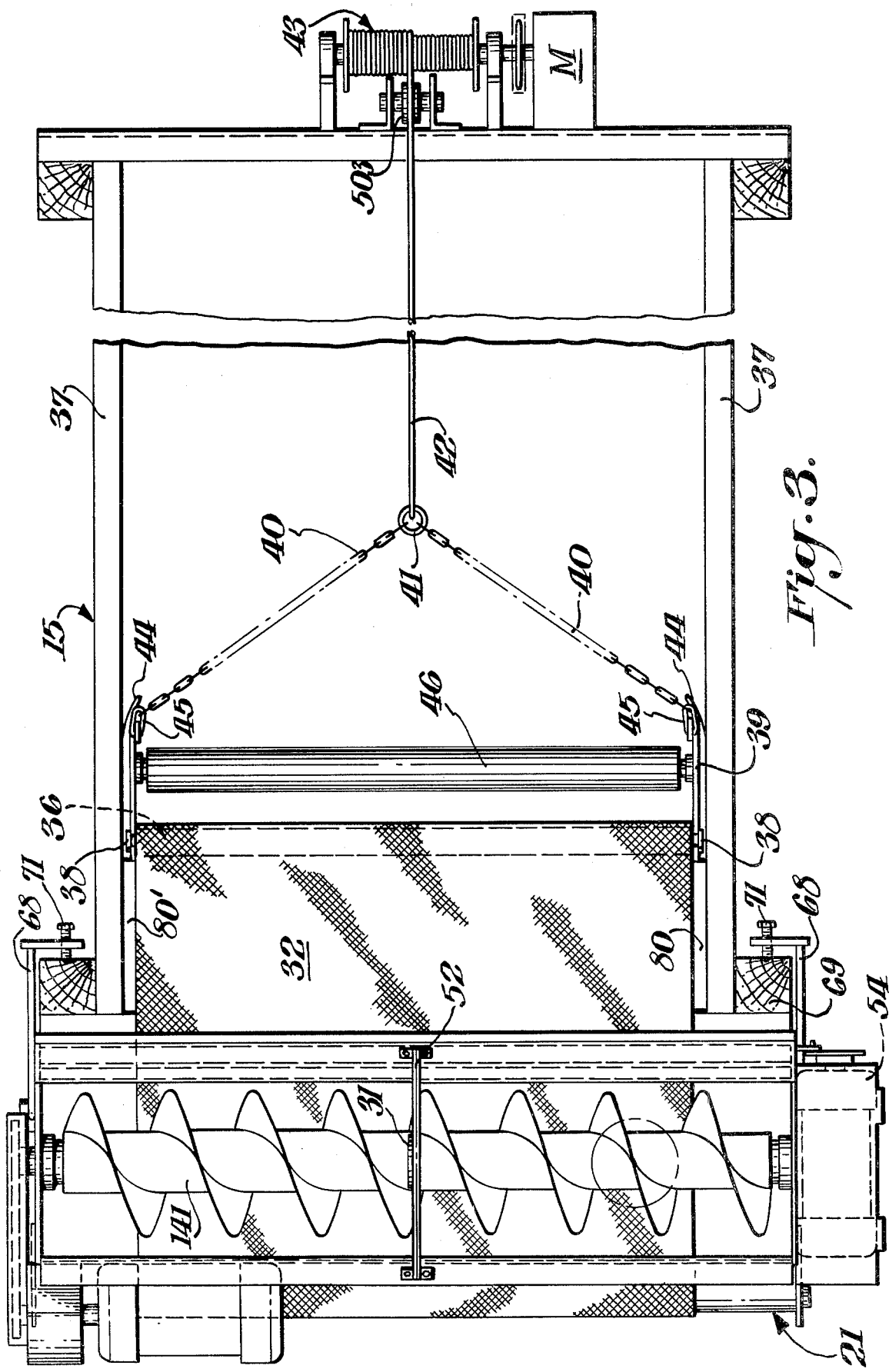
FIG. 3 is a top view of the apparatus of this invention shown in FIG. 2.

Irrespective of whether chute 20 is used, the casing 18 ultimately contained in box 21 is fed onto belt or net 32 which is shown in FIG. 3 without any material, such as casing 18 on it. As mentioned above, the belt 32 is rolled up on a roller, as shown at 33 in FIG. 2 with its other end being anchored at 34. The belt passes over idle roller 35 into box 21 to and around net pulley roller 36 and then to anchor 34. The axle of roller 36 extends beyond the edges of belt 32 and is in close proximity to the side walls 37 of shelf 15. Mounted between the retainer 38 (FIG. 3) of said axle and the edge of belt 32 is pulling bar 39, one at each edge. As shown in FIG. 3 each of the bars 39 is attached by chains 40 to a pull ring 41 which, in turn, is connected to cable 42 which is windable on winch 43 power driven by motor M. Other pulling arrangements can be used but one will wish to use a pulling system that is readily coupled and uncoupled, since rollers 36 and 46 will be needed at the start of the next run. Roller 46 is an idle roller which compresses the compost layer 16 making it uniform in thickness before casing 18 is dumped onto it.

As belt 32 is being pulled forward by motor M and the various pulling elements just described, it unwinds from roll 33 and the part being played out gets laid down on the top of casing 18 which has just been deposited as shown at 140 in FIG. 2. The casing 18 in distributor box 21 has been forced out of the box by moving belt 32 (FIG. 3) which carries it on its top as shown at 142 in FIG. 2. Belt 32 is assisted by auger 141 and oscillator teeth 60. Also, as can be seen at 143 in FIG. 2, the casing 18 falls off the belt 32 at its reversal point. When the belt reaches the midpoint of the shelf 15, a signal is caused to be given and an operator deactivates box 21 and elevator 19. The belt 32 at this midpoint has, from the midpoint back to box 21, a layer of casing 18 already on it, and this amount gets laid down on compost 16 during the last half of the travel distance of the belt.

Preferably all equipment is synchronized by electrical or electronic control, not shown for convenience.

Shown in FIGS. 2 and 3 in connection with chains 40 and the other pulling elements used in the belt movement is adjustment bar 44. As can be seen, it is positioned vertically and contains several notches in it, one above another. By varying the placement of gripping element 45 one may vary the pressure of pressure roll 46 which is best seen in FIG. 3. The higher the mounting of element 45 on element 44, the less the pressure on casing 18. Roller 46 moves on compost layer 16, and as it is pressed downwardly, it causes pivot point or roller 36 to move upwardly. That upward movement reduces the pressure on casing 18. Generally, the action of the shredder 24 and that of the distributing box 21 produce a proper casing which may be laid down without concern. Thus, element 44 is not essential and is frequently omitted. Proper looseness of casing 18, an important feature, can thus be efficiently attained with ease.

Figure 6A:
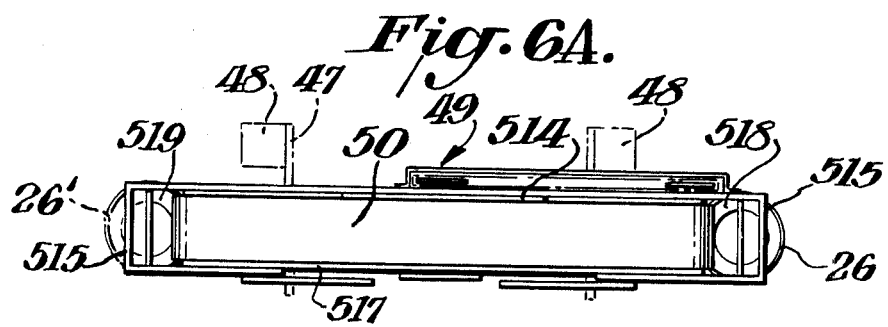
FIG. 6A is the plan view.

In the description thus far, each tier is prepared without reference to any tier of shelves adjacent to it. As mentioned, many commercial plants have a plurality of tiers crowded closely together with but one or perhaps two doors from the outside available for introducing elevator 19 into the building. Thus, it is highly desirable to prepare the shelves of one tier and those of an adjacent tier with a minimum of movement of equipment. In one embodiment of the invention, this efficiency is attained through the use of cross-conveyor 49 shown in FIG. 6. It is a box-like container which is placed just below the discharge end of elevator 19, generally replacing any chute. As shown in FIG. 6 it is conveniently mounted at supports 47 which in turn are mounted on uprights 48 of the respective tiers. The cross-conveyor is open at the top and readily receives the discharge end of elevator 19 as shown in FIG. 6. Since the endless belt 23 of elevator 19 is in effect throwing soil 18 forward at its discharge end, the cross-conveyor has a retaining wall 514 that is higher than its other walls. The end walls 515 and the front walls 516 (FIG. 6) are of about the same height. Retaining wall 514 prevents loss of soil 18. As shown in FIG. 6A, the endless belt 50 which rides within the container has a width which closely approximates the width of the container which can have, if desired, a solid bottom 517. The belt 50, however, has a length shorter than the length of the box so that two openings 518 and 519 are provided through which soil 18 will fall. These openings are approximately equal in size. While chute 20 or buckets 26 can be eliminated, cross-conveyor 49 functions best with one or with a plurality of telescoping or hollow elements 26–26' at its ends. Endless belt 50 is reversibly driven by motor M' positioned outside the conveyor and generally mounted on a side wall. As belt 50 is driven to the right in FIG. 6, casing 18 that has been fed into it is moved to the right and ejected at 513 into chute or conical element 26 and from there into distributing box 21 to be fed out onto belt 32 as described previously.

In looking at FIG. 6, it will be noted that a shelf which is somewhere between the top and bottom shelf is being processed. The shelves above have been completed. When the bottom shelf is finished, distributing box 21 is moved over to the bottom shelf of the tier on the left and the filling operation proceeds upwardly as indicated by 21'. In the upward processing, motor M' is made to run belt 50 to the left and casing is deposited in the distributor box 21' shown in FIG. 6 first passing through element 26'. It will, of course, be appreciated that the length of cross-conveyor 49 is sufficient to span the distance between the subject tiers; there generally is a walkway between the tiers, but this is usually minimal so that the length of cross-conveyor 49 is not substantial; it can be moved about quite easily.

As can be noted from FIG. 1, winch 43 is positioned on the bottommost shelf in tier 14. The pulley or idle roll 503 shown above it on the next shelf is removably attached to that and any other shelf. Thus, when a given shelf is prepared pulling elements 40 are disconnected from bars 39. If desired element 42 may have a hook (not shown) which is simply unhooked from ring 41 rather than be fixed to the ring as shown in FIG. 2. This provides for faster detachment. In any event, belt 32 is rewound at 33 (by hand or preferably by an electric motor, not shown for convenience) on the rotating roller on which the belt was previously wound. The distributor box 21 and the belt assembly are unanchored from the supports, and they and the pulley supply 503 are lowered (or raised) to their respective positions on the next shelf to be prepared.

The equipment of this invention is provided with means to move the parts about readily either horizontally or vertically. The raising and lowering arrangement for distributing box 21 is shown in FIG. 2. Element 31, the eye or bracket for hook 51, which is attached to the end of cable 30 windable on winch or pulley 29 (FIG. 6), is fixed to bar or rod 52 that is in turn fixed to box 21 (FIG. 3). Belt assembly unit 53 is usually attached to distributor box 21 though it need not be. The attachment, however, allows one to raise and lower and move horizontally the belt assembly unit 53 simultaneously with box 21.

While an endless belt has been shown in cross-conveyor 49 and an auger in distributing box 21 for moving casing from left to right or right to left as desired, either can use any such convenient means for moving the casing including reciprocating plates the flat sides of which are positioned parallelly to the end walls of the given container to push or pull the casing in said reciprocation.

One embodiment of the oscillator or reciprocating device 55 is shown in FIG. 5. While it effects some movement of soil 18 within box 21 to the right and to the left in a reciprocal fashion and does assist in moving the soil 18 out of box 21, its most important function is to dislodge stones and prevent channeling as described above. The device comprises a vertically positioned bar 57 which is connected by rod 58 to cam 59 that is driven by a motor 54. The reciprocating bar 57 has a plurality of teeth 60 extending downwardly just a bit past cut-off plate 62 and terminating just above belt 32 which is moving toward the viewer in FIG. 5. The cross-section of the belt lying between anchor 34 and the viewer is designated as 32' in FIG. 5.

The spacing 61 between teeth 60 is such that they completely sweep or clean the inside surface of cut-off plate 62. Thus, as bar 57 goes back and forth within box 21 it constantly is hitting the soil and will knock free any stones or the like that are stuck. Also, bar 57 has a shearing or breaking up action on lumps of casing. These functions afford the production of a layer of casing on belt 32 that is quite uniform in depth and in particle size.

Also shown in FIG. 5 is spacer element or cut-off plate 62. It is movably mounted on wall 63 of box 21 by the slot 64 and pin 65 arrangement. The pins 65 are bolts or screws which allow one to raise or lower the spacer 62 so that the gap 56 can be made smaller or larger depending upon the thickness the layer that one desires for the casing.

In a preferred embodiment spacer element or cut-off plate 62 and oscillator teeth 60 are mounted to be raised or lowered as a unit so that the distance the teeth extend below the plate is always constant. Further, as shown in FIG. 8 the cut-off plate or spacer 62 has a vertical plate 73 and a lower plate 74 that extends downwardly from 73 at an angle of about 20° to 50° and preferably 45° so that when positioned in box 21 the lower plate 74 is directed toward auger 141. The bottom portion 72 in effect acts as a doctor-knife. The soil 18 coming towards the plate 62 is cut as by a blade by bottom portion 72.

It is also to be appreciated that the cut-off plate 62 can be made in sections or, if unitary, may contain cut-a-way portions at its edges to afford uniform layering at the edges of the bed. In FIG. 7, a front view of a preferred cut-off plate, are shown three sections 75, 76 and 77. Sections 75 and 77 are attachable, by any convenient means, indicated by dotted lines 78 and 79, respectively, to section 76. It will be noted in FIG. 3 that net 32 is less in width than that of the bed, there being gaps 80 and 80' at the edges. It is highly desired that these areas be not only covered with casing 18 but with a layer uniform in thickness to that of the rest of the bed. Notches 81 and 82 in the preferred plate shown in FIG. 7 allow more casing to go on the edges of belt 32 than goes on the rest of the belt since the bottom edge of section 76 comes closer to belt 32 than do the bottom edges of sections 75 and 77. That extra soil at the edges generally moves by gravity toward side walls 37, or the operator can do the leveling as he carriers roller 36 or 46 back for the next run.

The oscillating plate 57 on which the teeth are mounted or with which they are unitary lies right up against the inner wall of cut-off plate 62.

From FIG. 9, a plan view of the bottom 83 of a preferred distributor box 21, it can be seen that a plate 84 runs from the back wall 85 almost to bar 86, thus leaving a gap 87. The plate terminates about one inch from the lower extremity of cut-off plate 62 (plate 74). It will be recalled that net 32 enters the box 21 from the rear. It rides on top of bottom section 84 but in area 87 it acts solely as the bottom for box 21. It is in this area, as explained above, that any stone or similar hard object, knocked loose by the oscillator or freely entering this area, will be smoothly ejected by the downward yielding of net 32. Wedging of rocks or the like can cause ripping of the net and blocking of soil which in turn leads to uneven layering. Therefore, the use of the embodiment of FIG. 9 for the distributing box 21 is highly desirable.

Bar 86 shown in FIGS. 5 and 9 is needed to support net 32 just as it emerges from box 21. The compost layer 16 may initially be of a height that is above net 32 or it may be lower. If that height is not even with belt 32, the belt must initially move upwardly or downwardly to begin its ride on the top of the compost. If a downward pull is exerted on the belt and it is unsupported (bar 86 being absent) more soil 18 will get dumped onto belt 32 than is desired. Bar 86 keeps proper tension on the belt right at the cut-off plate so that only the desired amount of soil 18 passes onto belt 32.

Since distributing box 21 is open at the bottom at its rear wall to permit entrance of belt 32 (FIG. 4) and since belt 32 is in effect acting as the bottom though moving, it is possible for casing 18 within the box to be ejected from the gap in the rear wall, assuming the wall 63 bearing gap 56 to be the front wall. To prevent this or to reduce such to a minimum, one can place a flexible strip 72 (FIG. 4) anchored to a subject wall as at 66 to be in contact with the belt 32. This contact is best seen at 67 in FIG. 2. Since the moving belt 32 as the bottom helps move the soil 18 toward and out of gap 56, it will be appreciated that soil could become placed under the moving belt. Such placement is undesirable for several reasons. For example, it produces drag on the net; stones or sharp objects positioned there cause cutting of the net. Also, soil gathering there gets compacted with build-ups occurring that either cause a complete shut down or very uneven layering. To prevent that skirts or strips like 89 run inside box 21 from the rear wall close or about to cut-off plate 62. As shown in FIG. 10, net 32 runs between the top surface of plate 84 and the bottom surface of strip 89 (usually aluminum), except in the gap area 87 into which plate 84 does not extend. Thus, in all the critical areas within the box the belt 32 is effectively sealed off so that soil or casing 18 cannot get underneath it.

As will be recalled, one can feed casing 18 directly into the distributing box without using the cross-conveyor (FIG. 1, for example). If desired, one can increase the length of distributing box 21 shown in FIG. 3, for example, so that it extends substantially beyond both sidewalls 37 of the tier or only one of them. Such an extended distributing box, while within the scope of this invention, presents problems. For example, the purpose in extending the length is to enable the box to straddle adjacent tiers just as cross-conveyor 49 does in FIG. 6. The straddling of the box would then eliminate the cross-conveyor. However, as will be recalled, the box 21 is lowered shelf by shelf for the one tier and then similarly raised shelf by shelf for the adjacent tier. The enlarged box makes for much more difficult handling and seriously hampers the mobility of the operators and increases hazards, because of the confined spaces. The straddling of cross-conveyor 49 does not cause these problems since it is positioned over-head, is out of the way and remains there.

While horizontal maneuverability of box 21 is achieved by use of rollers 88 (FIG. 1), either for standard length or a lengthened box 21, it is preferred to use a distributing box 21 of the length suggested by FIG. 3 since an operator can easily walk around it to the right or left to gain access to the walkways parallel to sides 37.

FIG. 2 depicts clamp 68 which allows one to pull box 21 up tightly against upright 69 of tier 14, thus preventing undue movements of box 21 that might disrupt the formation of a uniform layer of casing or cause other problems. This clamp is pivotally mounted at 70 to box 21 (FIG. 4) and fits around upright 69, as shown in FIG. 3, with adjusting nut 71 to pull box 21 toward tier 14 to allow removal of clamp 68 by loosening nut 71 and pivoting the clamp away from upright 69 to afford its clearance and removal. Each end of box 21 is so equipped.

Through the apparatus of this invention the casing operation can be effected with a minimum of personnel. The equipment is easily installed and moved about even in the confined areas of conventional mushroom houses. Most importantly, a uniform layer of material, such as the vital layer of casing, can be formed. The width of the belt used conforms very closely to the width of the shelf or bed so that uniform layering even at the edges is readily achieved. The equipment allows one to prepare multiple tiers with considerably more ease and within much less time than hitherto possible. Further, the distributing box eliminates the troublesome aspect of placing a heterogeneous layer of casing down. Large lumps of soil are avoided. Thus, greater yields of mushrooms, not only in quantity and size, but in quality, are attained by use of the apparatus of this invention.

One can, of course, use the apparatus of this invention for handling materials other than casing. For example, the equipment can be used to deposit the compost layer on the shelf. If desired the cross-conveyor and the distributing box or the latter by itself can be used to deposit compost on the belt which may be allowed to stay in place throughout the growing season and later rewound to discharge the compost and material on it. In the rewinding the belt can be washed or otherwise cleaned preparatory to reuse. The elements of this invention combine to afford facility and economics in the difficult art of mushroom growing.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. In an apparatus for depositing particulate material for mushroom growing wherein the particulate material is to be deposited at a uniform depth upon the surface of an elongated bed, the apparatus including a distributor box mounted near one end of the surface, the distributor box having an elongated discharge opening disposed toward the surface and of a length generally corresponding to the width of the surface, means for feeding the particulate material into the distributor box, a belt mounted at one end to a supply roller and anchored at its other end near the one end of the surface with a portion of the belt rolled around the supply roller, the belt passing through the lower portion of the distributor box and emerging from the distributor box through the discharge opening, means for unwinding the belt from the supply roller and moving it toward the other end of the surface for passing the belt over the surface and with the belt having a movable reversal point as it is moved over the surface and means for rewinding the belt on the supply roller with the movable reversal point thereby moving back toward the one end of the surface whereby particulate material fed into the distributor box is deposited on the belt and carried by the belt toward the other end of the surface as the belt reversal point moves toward the other end of the surface and the particulate material is then deposited on the surface as the belt reversal point moves toward the other end of the surface, the improvement being a cut-off plate secured to said distributor box and defining the upper end of said discharge opening and said belt defining the lower end of said discharge opening, means in said distributor box for facilitating the movement of the particulate material through said discharge opening in an even distribution manner and for breaking up the particulate material to prevent clogging of said discharge opening and to prevent the formation of empty spaces in the particulate material discharged from said discharge opening and for dislodging stones and the like which may be in said particulate material and to sweep the inside surface of said cut-off plate, said means in said distributor box comprising an elongated bar mounted against the inner surface of said cut-off plate at the top of said discharge opening, said bar having a plurality of downwardly extending teeth, said teeth extending beyond said cut-off plate toward said belt and being spaced above said belt to provide a continuous open gap above and across the width of said belt, and means for oscillating said bar in a horizontal direction perpendicular to the length of said belt.

2. The apparatus of claim 1 wherein said particulate material is mushroom casing spread upon the top surface of compost.

3. Apparatus in accordance with claim 1 which includes an additional roller positioned and moving ahead of said pulley roller and rolling on said surface, thereby affording pressure on said surface which is to receive said material.

4. The apparatus of claim 1 wherein said distributor box contains means for keeping said box full of said material from one end of it to the other.

5. The apparatus of claim 4 wherein said means for keeping said box full comprises an auger.

6. The apparatus of claim 1 wherein said belt acts solely as the bottom of said box at said discharge opening.

7. Apparatus in accordance with claim 6 which includes a bar mounted outside said box running from side wall to side wall thereof at said discharge opening, the top surface of said bar being contiguous with the plane of the bottom of said box, said belt moving on top of said bar, thus affording a support for said belt as it leaves the area in which it is unsupported in said box and in which it is acting solely as the bottom of said box.

8. Apparatus in accordance with claim 1 wherein said box includes a bottom, an opening in said bottom in gap relationship with said discharge opening affording an area over which said moving belt acts solely as the bottom of said box.

9. Apparatus in accordance with claim 8 which includes a bar mounted outside said box running from side wall to side wall thereof at said discharge opening, the top surface of said bar being continuous with the plane of the bottom of said box, said belt moving on top of said bar which thus affords a support for said belt as it leaves the area in which it is unsupported in said box and in which it is acting solely as the bottom of said box.

10. Apparatus in accordance with claim 1 including means for mounting said bar to said cut-off plate in such a manner whereby said cut-off plate may be selectively moved up and down with respect to said bar and whereby said bar and cut-off plate may be selectively moved up and down as a unit.

11. In an apparatus for deposiging particulate material for mushroom growing wherein the particulate material is to be deposited at a uniform depth upon the surface of an elongated bed, the apparatus including a distributor box mounted near one end of the surface, the distributor box having an elongated discharge opening disposed toward the surface and of a length generally corresponding to the width of the surface, means for feeding the particulate material into the distributor box, a belt mounted at one end to a supply roller and anchored at its other end near the one end of the surface with a portion of the belt rolled around the supply roller, the belt passing through the lower portion of the distributor box and emerging from the distributor box through the discharge opening, means for unwinding the belt from the supply roller and moving it toward the other end of the surface for passing the belt over the surface and with the belt having a movable reversal point as it is moved over the surface and means for rewinding the belt on the supply roller with the movable reversal point thereby moving back toward the one end of the surface whereby particulate material fed into the distributor box is deposited on the belt and carried by the belt toward the other end of the surface as the belt reversal point moves toward the other end of the surface and the particulate material is then deposited on the surface as the belt reversal point moves toward the other end of the surface, the improvement being said belt forming the bottom of said distributor box at said discharge opening, fixed support means for said belt within said distributor box upstream from said discharge opening, fixed support means for said belt outside of said box downstream from said discharge opening, said belt being unsupported at said discharge opening between said upstream and downstream support means to provide sufficient downward clearance for the downward movement of said belt whereby stones or the like may be discharged through said discharge opening by forcing said belt downward until the portion of said belt supporting the stone or the like is moved away from said discharge opening, and said upstream and downstream support means maintaining said belt tensioned to maintain said belt generally horizontal under the weight of said particulate material to permit only the desired amount of particulate material to pass through said discharge opening while permitting said belt to move downward when a stone or the like passes through said discharge opening.

12. Apparatus in accordance with claim 11 including means for altering the size of said discharge opening.

13. Apparatus in accordance with claim 11 which includes means for keeping said box full of said material from one end of it to the other.

14. Apparatus in accordance with claim 13 in which said keeping means comprises an auger.

15. Apparatus in accordance with claim 11 wherein said downstream support means comprises a bar mounted outside said box running from side wall to side wall thereof at said discharge opening, said box having a bottom wall to comprise said upstream support means, the top surface of said bar being contiguous with the plane of said bottom wall of said box, said belt moving on top of said bar, thus affording a support for said belt as it leaves the area in which it is unsupported in said box and in which it is acting solely as the bottom of said box.

16. Apparatus in accordance with claim 11 which includes a bar having a plurality of teeth and being capable of being driven in an oscillating manner in close proximity to and along the length of said discharge opening.

17. In an apparatus for depositing particulate material for mushroom growing wherein the particulate material is to be deposited at a uniform depth upon the surface of an elongated bed, the apparatus including a distributor box mounted near one end of the surface, the distributor box having an elongated discharge opening disposed toward the surface and of a length generally corresponding to the width of the surface, means for feeding the particulate material into the distributor box, a belt mounted at one end to a supply roller and anchored at its other end near the one end of the surface with a portion of the belt rolled around the supply roller, the belt passing through the lower portion of the distributor box and emerging from the distributor box through the discharge opening, means for unwinding the belt from the supply roller and moving it toward the other end of the surface for passing the belt over the surface and with the belt having a movable reversal point as it is moved over the surface and means for rewinding the belt on the supply roller with the movable reversal point thereby moving back toward the one end of the surface whereby particulate material fed into the distributor box is deposited on the belt and carried by the belt toward the other end of the surface as the belt reversal point moves toward the other end of the surface and the particulate material is then deposited on the surface as the belt reversal point moves toward the other end of the surface, the improvement being a cut-off plate secured to said distributor box and defining the upper end of said discharge opening and said belt defining the lower end of said discharge opening, means in said distributor box for facilitating the movement of the particulate material through said discharge opening in an even distribution manner and for breaking up the particulate material to prevent clogging of said discharge opening and to prevent formation of empty spaces in the particulate material discharged from said discharge opening and for dislodging stones and the like which may be in said particulate material and to sweep the inside surface of said cut-off plate, said means in said distributor box comprising an elongated bar mounted against the inner surface of said cut-off plate at the top of said discharge opening, said bar having a plurality of downwardly extending teeth, said teeth extending beyond said cut-off plate toward said belt and being spaced above said belt to provide a continuous open gap above and across the width of said belt, means for oscillating said bar in a horizontal direction perpendicular to the length of said belt, said belt forming the bottom of said distributor box at said discharge opening, fixed support means for said belt within said distributor box upstream from said discharge opening, fixed support means for said belt outside of said box downstream from said discharge opening, said belt being unsupported at said discharge opening between said upstream and downstream support means to provide sufficient downward clearance for the downward movement of said belt whereby stones or the like may be discharged through said discharge opening by forcing said belt downward until the portion of said belt supporting the stone or the like is moved away from said discharge opening, and said upstream and downstream support means maintaining said belt tensioned to maintain said belt generally horizontal under the weight of said particulate material to permit only the desired amount of particulate material to pass through said discharge opening while permitting said belt to move downward when a stone or the like passes through said discharge opening.

18. Apparatus in accordance with claim 17 which includes means for keeping said box full of said material from one end of it to the other.

19. Apparatus in accordance with claim 18 in which said keeping means comprises an auger.

* * * * *